US009114781B2

(12) United States Patent
Wake et al.

(10) Patent No.: US 9,114,781 B2
(45) Date of Patent: Aug. 25, 2015

(54) MOVING BODY (71) Applicant: HONDA MOTOR CO., LTD., Tokyo (JP)

(72) Inventors: Chihiro Wake, Saitama (JP); Koichi Takaku, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 346 days.

(21) Appl. No.: 13/845,494

(22) Filed: Mar. 18, 2013

(65) Prior Publication Data

US 2013/0244124 A1    Sep. 19, 2013

(30) Foreign Application Priority Data

Mar. 19, 2012 (JP) .................................. 2012-062857

(51) Int. Cl.
 B60S 5/02      (2006.01)
 F02D 19/02     (2006.01)
 F02M 21/02     (2006.01)

(52) U.S. Cl.
 CPC ................. B60S 5/02 (2013.01); F02D 19/025 (2013.01); F02D 19/027 (2013.01); F02M 21/0221 (2013.01); Y02T 10/32 (2013.01)

(58) Field of Classification Search
 CPC ....... B60S 5/02; F02D 19/025; F02D 19/026; F02D 19/027; F02M 21/02; F02M 21/0218; F02M 21/0221
 USPC .......................... 141/94–95, 98, 197; 123/1 A
 See application file for complete search history.

(56) References Cited

U.S. PATENT DOCUMENTS 3,837,377 A * 9/1974 McJones ............................ 141/4
5,409,046 A * 4/1995 Swenson et al. ................ 141/11
5,628,349 A * 5/1997 Diggins et al. .................... 141/3

(Continued)

FOREIGN PATENT DOCUMENTS

DE  10 2010 041 326 A1   3/2012
DE  11 2011 100 541 T5   11/2012

(Continued)

OTHER PUBLICATIONS

Japanese Office Action application No. 2012-062857 dated Dec. 17, 2013.

(Continued)

*Primary Examiner* — Nicolas A Arnett
(74) *Attorney, Agent, or Firm* — Squire Patton Boggs (US) LLP (57) ABSTRACT

A fuel cell vehicle is provided that allows for filling as much fuel gas as possible. The vehicle includes a high-pressure tank, a communication system, a communicative filling ECU that selectively executes communicative filling that transmits a data signal from the communication system to the dispenser and allows hydrogen to be filled by way of the dispenser into the tank at a flowrate dependent on the pressure and the temperature; and non-communicative filling that does not transmit a data signal from the communication system and allows hydrogen to be filled at a predetermined flowrate. The ECU determines, while executing communicative filling, whether this communicative filling can be continued to be executed, and interrupts communicative filling and continues hydrogen filling by switching the filling method to non-communicative filling in response to having determined that continuation of communicative filling is not possible.

15 Claims, 6 Drawing Sheets

(56) References Cited

U.S. PATENT DOCUMENTS

| | | | |
|---|---|---|---|
| 5,641,005 A * | 6/1997 | Kountz et al. | 141/83 |
| 5,810,058 A * | 9/1998 | Kountz et al. | 141/83 |
| 5,881,779 A * | 3/1999 | Kountz et al. | 141/83 |
| 6,360,793 B1 * | 3/2002 | Sugano et al. | 141/197 |
| 6,655,422 B2 * | 12/2003 | Shock | 141/83 |
| 6,779,568 B2 * | 8/2004 | Borck | 141/67 |
| 7,216,040 B2 * | 5/2007 | Copeman et al. | 702/24 |
| 7,344,687 B2 * | 3/2008 | Oi et al. | 422/198 |
| 7,568,507 B2 * | 8/2009 | Farese et al. | 141/95 |
| 7,921,883 B2 * | 4/2011 | Cohen et al. | 141/49 |
| 8,020,589 B2 * | 9/2011 | Cohen et al. | 141/95 |
| 8,156,970 B2 * | 4/2012 | Farese et al. | 141/94 |
| 8,286,675 B2 * | 10/2012 | Farese et al. | 141/94 |
| 8,708,005 B2 * | 4/2014 | Mori | 141/197 |
| 8,948,947 B2 * | 2/2015 | Takaku et al. | 701/22 |
| 2004/0163731 A1 * | 8/2004 | Eichelberger et al. | 141/284 |
| 2005/0103400 A1 * | 5/2005 | Eichelberger et al. | 141/231 |
| 2005/0178463 A1 * | 8/2005 | Kountz et al. | 141/4 |
| 2007/0186982 A1 * | 8/2007 | Cohen et al. | 137/487.5 |
| 2009/0064764 A1 * | 3/2009 | Kizaki et al. | 73/40.5 R |
| 2009/0133674 A1 * | 5/2009 | Lee et al. | 123/527 |
| 2010/0203411 A1 * | 8/2010 | Hasuka | 429/442 |
| 2011/0252962 A1 * | 10/2011 | Von Helmolt et al. | 95/15 |
| 2011/0286913 A1 * | 11/2011 | Lugtigheid | 423/658.2 |
| 2012/0125480 A1 * | 5/2012 | Inagi et al. | 141/4 |
| 2012/0125482 A1 * | 5/2012 | Mori | 141/98 |
| 2012/0318378 A1 | 12/2012 | Yahashi et al. | |
| 2013/0037165 A1 * | 2/2013 | Okawachi et al. | 141/4 |
| 2014/0277880 A1 * | 9/2014 | Takaku et al. | 701/22 |
| 2014/0295305 A1 * | 10/2014 | Wake et al. | 429/429 |
| 2014/0311622 A1 * | 10/2014 | Cohen | 141/4 |

FOREIGN PATENT DOCUMENTS

| | | |
|---|---|---|
| EP | 1 767 845 A1 | 3/2007 |
| JP | WO2006006715 A1 | 1/2006 |
| JP | 2011-122657 A | 6/2011 |
| JP | 2013-508641 A | 3/2013 |
| WO | 2011/049466 A1 | 4/2011 |

OTHER PUBLICATIONS

Japanese Office Action application No. 2012-062857 dated Mar. 4, 2014.

German Search Report issued to DE application No. 10 2013 204 632.4 mailed Nov. 5, 2013.

* cited by examiner

MOVING BODY

This application is based on and claims the benefit of priority from Japanese Patent Application No. 2012-062857, filed on 19 Mar. 2012, the content of which is incorporated herein by reference.

BACKGROUND OF THE INVENTION

1. Field of the Invention

The present invention relates to a moving body. In more detail, it relates to a moving body including a storage vessel and allowing fuel gas to be filled from an external supply device into the storage vessel.

2. Related Art

Fuel cell vehicles travel by supplying air and hydrogen to the fuel cell, and driving an electric motor using the electric power thereby generated. In recent years, progress has been made in the practical implementation of fuel cell vehicles employing such fuel cells as the energy source for generating motive power. Although hydrogen is required to generate electric power with fuel cells, with the fuel cell vehicles of recent years, vehicles have become mainstream that store a sufficient amount of hydrogen in advance in a high-pressure tank or a hydrogen tank equipped with a storage alloy, and use the hydrogen inside of the tank to travel. In concert with this, vigorous research has progressed also in technology for filling hydrogen into the tank.

For example, Patent Document 1 describes a filling system configured by a vehicle equipped with a hydrogen tank as well as a pressure sensor and temperature sensor for observing the state of this hydrogen tank, and a hydrogen station that supplies hydrogen into the hydrogen tank of this vehicle. In this system, when filling hydrogen from a dispenser of the hydrogen station into the hydrogen tank, a signal generated based on the detection signal of the above-mentioned sensor is transmitted from the vehicle side to the hydrogen station side, the required filling amount is grasped by the hydrogen station side based on the signal received from the vehicle side, and further, the pressure and filling flowrate are adjusted when supplying hydrogen to the vehicle side. Hereinafter, filling hydrogen while performing communication between the vehicle side and station side will be referred to as communicative filling. According to such communicative filling, it is possible to fill hydrogen as quickly as possible in accordance with the state of the hydrogen tank on the vehicle side.

With the filling system of Patent Document 1, an abnormality in the pressure sensor or temperature sensor equipped to the above-mentioned vehicle is determined based on a signal transmitted from the vehicle side to the hydrogen station side while performing communicative filling, and it is configured so that when it is determined that there is an abnormality in a sensor of the vehicle, the filling amount of hydrogen is reduced or the filling of hydrogen is forcibly interrupted, whereby communicative filling is being prevented based on false information from the vehicle side.

Patent Document 1: Japanese Unexamined Patent Application, Publication No. 2011-122657

SUMMARY OF THE INVENTION

With the filling system of Patent Document 1, irrespective of being a state like there being an abnormality in the hydrogen tank, for example, and filling in itself being possible, since the filling amount may be decreased or filling may be forcibly interrupted in response to an abnormality having been determined in the temperature sensor or pressure sensor, a user wanting to fill the largest amount of hydrogen as possible may suffer an unintended disadvantage.

The present invention has an object of providing a moving body configured so that communicative filling is performed, and can fill as much fuel gas as possible.

In order to achieve the above-mentioned object, the present invention according to a first aspect provides a moving body that includes: a storage vessel (e.g., the high-pressure tank 32 described later) that stores a fuel gas; a pressure detection means (e.g., the pressure sensor 326 described later) for detecting a pressure inside of the storage vessel; a temperature detection means (e.g., the temperature sensor 327 described later) for detecting a temperature of the storage vessel; a transmitting means (e.g., the communication system 5, communicative filling ECU 51, infrared transmitter 56, etc. thereof described later) for externally transmitting a data signal generated based on the pressure and the temperature thus detected; a communication electric power supply means (e.g., the communicative filling ECU 51, low-voltage battery 52 and high-voltage battery 38 described later) for providing an electric power source that supplies electric power to the transmitting means; and a control means (e.g., the communicative filling ECU 51 described later) for enabling selective execution, as a method of filling fuel gas from an external supply device (e.g., the dispenser 12 described later) to the storage vessel, of communicative filling that transmits the data signal from the transmitting means to the supply device and allows the fuel gas to be filled by way of the supply device into the storage vessel at a flowrate dependent on the pressure and the temperature; and non-communicative filling that allows the fuel gas to be filled by the supply device into the storage vessel at a predetermined flowrate. The control means is characterized by including: a communication continuation determination means (e.g., the communicative filling ECU 51, and means related to execution of S2 and S3 in FIG. 2 and S11 to S13 in FIG. 4 described later) for determining, while executing communicative filling, whether continued execution of the communicative filling is possible; and a filling method switching means (e.g., the communicative filling ECU 51, and means related to execution of S5 in FIG. 2 described later) for interrupting communicative filling during execution, and continuing filling of the fuel gas by switching the filling method to non-communicative filling, in response to the communication continuation determination means having determined that continuation of communicative filling is not possible.

In the first aspect of the present invention, it is determined, while filling fuel gas by executing communicative filling, whether this communicative filling can be continued to be executed, and in the case of having determined that continuation of communicative filling is not possible, interrupts communicative filling, and continues the filling of fuel gas by switching the filling method to non-communicative filling. In other words, filling in itself is not immediately interrupted just because it has been determined that the continuation of communicative filling is not possible. Therefore, although there is a possibility of filling not being carried out to near complete filling and a possibility of requiring a long time in filling when compared with a case of continuously performing communicative filling, it is possible to fill as much fuel gas as possible into the storage vessel.

According to a second aspect of the present invention, it is preferable for the communication continuation determination means to determine that continuation of communicative filling is not possible in a case of any one of the following four conditions having been satisfied:

1: case of an amount of charge in a communication power source being no higher than a predetermined continuation minimum value, in which the communication power source is the power source supplying electric power to the transmitting means;

2: case of having determined that the pressure detection means has failed;

3: case of having determined that the temperature detection means has failed; and 4: case of having determined that a remaining amount detection means (e.g., the voltage sensor 58 for low-voltage battery, voltage sensor 381 for high-voltage battery, etc. described later) for detecting the amount of charge in the communication power source has failed.

It is considered that the transmission means cannot transmit a data signal accurately reflecting the state of the storage vessel in a case of the pressure detection means or temperature detection means having failed, a case of the amount of charge in the communication power source and a case of the remaining amount detection means for detecting the amount of charge thereof having failed; therefore, it is considered not possible to continue appropriate communicative filling; however, since it is not a failure of the storage vessel itself, it is considered that the filling of fuel gas can be continued. In the second aspect of the present invention, filling can be continued as long as possible by appropriately determining that continuation of filling is possible in this way.

According to a third aspect of the present invention, it is preferable for the control means to further include: a filling continuation determination means (e.g., the communicative filling ECU 51, and means related to execution of S1 in FIG. 2 described later) for determining whether filling of the fuel gas can continue to be executed while executing communicative filling or non-communicative filling; and a filling end means (e.g., the communicative filling ECU 51, and means related to execution of S7 in FIG. 2 described later) for interrupting communicative filling or non-communicative filling during execution, and ending filling of the fuel gas, in response to the filling continuation determination means having determined that continuation of filling is not possible.

According to the third aspect of the present invention, it is possible to appropriately distinguish between a case in which the continuation of filling is possible by switching from communicative filling to non-communicative filling, and a case in which the continuation of filling in itself of fuel gas is not possible irrespective of the filling method.

According to a fourth aspect of the present invention, it is preferable for the storage vessel to be a high-pressure tank (e.g., the high-pressure tank 32 described later) that stores hydrogen at high pressure, the moving body to include a fuel cell (e.g., the fuel cell 31 described later) that generates electric power using hydrogen supplied from the high-pressure tank via a hydrogen supply pipe (e.g., the hydrogen supply line 35 described later), and the filling continuation determination means to determine that continuation of filling of the fuel gas is not possible in a case of at least one among the following two conditions having been satisfied:

1: case of having determined that a hydrogen sensor (e.g., the hydrogen concentration sensor 328 described later) that detects a hydrogen concentration in a vicinity of the high-pressure tank has failed; and 2: case of having determined that an intermediate-pressure sensor (e.g., the intermediate-pressure sensor 352 described later) that detects pressure in the hydrogen supply pipe on a side further downstream than a portion at which a regulator (e.g., the regulator 351 described later) that reduces the pressure of high-pressure hydrogen inside of the high-pressure tank is provided has failed.

According to the fourth aspect of the present invention, it is possible to appropriately end filling by appropriately determining states in which the continuation of the filling is not possible irrespective of the filling method.

According to a fifth aspect of the present invention, it is preferable for the continuation minimum value to be a value summing a minimum required amount (e.g., the operation guaranteed amount described later) for guaranteeing normal operation of a plurality of devices driven by electric power from the communication power source, an amount (e.g., the next startup-time required amount described later) required in the communication power source during next startup of the moving body, and an amount (e.g., the filling log recording amount described later) required in the communication power source for electromagnetically recording information related to filling.

According to the fifth aspect of the present invention, since data signals are transmitted using the electric power of the communication power source during communicative filling, it is consider that the amount of charge in the communication power source decreases with time. Therefore, by switching the filling method from communicative filling to non-communicative filling in a case of the amount of charge in the communication power source having become no higher than a continuation minimum value set as described above, it is possible to ensure a remaining amount of communication power source by a next startup-time required amount, while reliably leaving information (filling log) related to filling at the time of switching. In addition, although the voltage greatly declines from the standard value when the amount of charge excessively declines, and the operation of devices driven by this is no longer guaranteed. According to the present invention, since the amount of charge in the communication power source during communicative filling will not fall below the minimum required amount in order to guarantee normal operation of the transmitting means, it is possible to prevent inaccurate data signals from being transmitted from the transmitting means.

According to a sixth aspect of the present invention, in this case, it is preferable for the communication electric power supply means to include a first electricity storage device (e.g., the low-voltage battery 52 described later) as an electric power source that supplies electric power to a plurality of auxiliary devices including the transmitting means, and a second electricity storage device (e.g., the high-voltage battery 38 described later) having a larger discharge capacity than the first electricity storage device. A first threshold (e.g., the threshold c described later) is defined as a value summing a minimum required amount for guaranteeing normal operation of a plurality of devices driven by electric power from the first electricity storage device and an amount required in the first electricity storage device during next startup of the moving body. A second threshold (e.g., the threshold a described later) is defined as a value adding to the first threshold an amount required in the first electricity storage device for electromagnetically recording information related to filling. A third threshold (e.g., the threshold b described later) is defined as a value summing a minimum required amount for guaranteeing normal operation of a plurality of device driven by electric power from the second electricity storage device, an amount required in the second electricity storage device during next startup of the moving body, and a stored electricity amount required in the second electricity storage device for electromagnetically recording information related to filling. The control means further include a communication power source switching means (e.g., the communicative filling ECU 51, and means related to execution of S25 in FIG. 5 described later) for switching the communication power source from the first electricity storage device to the second electricity storage device, in a case of the amount of charge in the second electricity storage device being larger than the third threshold, when the amount of charge in the first electricity storage device becomes no higher than the second threshold while executing communicative filling with the first electricity storage device as the communication power source.

According to the sixth aspect of the present invention, in the case of having preparing the two electrical power sources of the first electricity storage device and the second electricity storage device, using the first electricity storage device as the communication power source and the amount of charge thereof having become small during the use thereof, it is possible to continue communicative filling as long as possible by continuing communicative filling upon switching the communication power source to the second electricity storage device. In addition, by determining the timing at which to switch the communication power source with the aforementioned first to third thresholds set for the amount of charge in the first and second electricity storage devices, it is possible to ensure the amount of charge in the first electricity storage device and the second electricity storage device by the amount required during a subsequent startup, while reliably leaving a filling log as described above.

According to a seventh aspect of the present invention, it is preferable for the communication power source switching means, in a case of switching from the first electricity storage device to the second electricity storage device, to switch to the second electricity storage device after the amount of charge in the first electricity storage device has declined down to the first threshold.

With the presumption of switching the communication power source from the first electricity storage device to the second electricity storage device having a surplus in the amount of charge, an amount for electromagnetically recording a filling log when switching from communicative filling to non-communicative filling is no longer necessary in the first electricity storage device. With the seventh aspect of the present invention, by exhausting the amount of charge in the first electricity storage device down until the amount required in recording of the above-mentioned filling log, prior to switching the communication power source from the first electricity storage device to the second electricity storage device, it is possible to prevent useless switching of the communication power source, and thus reduce the energy loss accompanying the switching of the communication power source.

DETAILED DESCRIPTION OF THE INVENTION

Hereinafter, an embodiment of the present invention will be explained while referencing the drawings.

Figure 1:
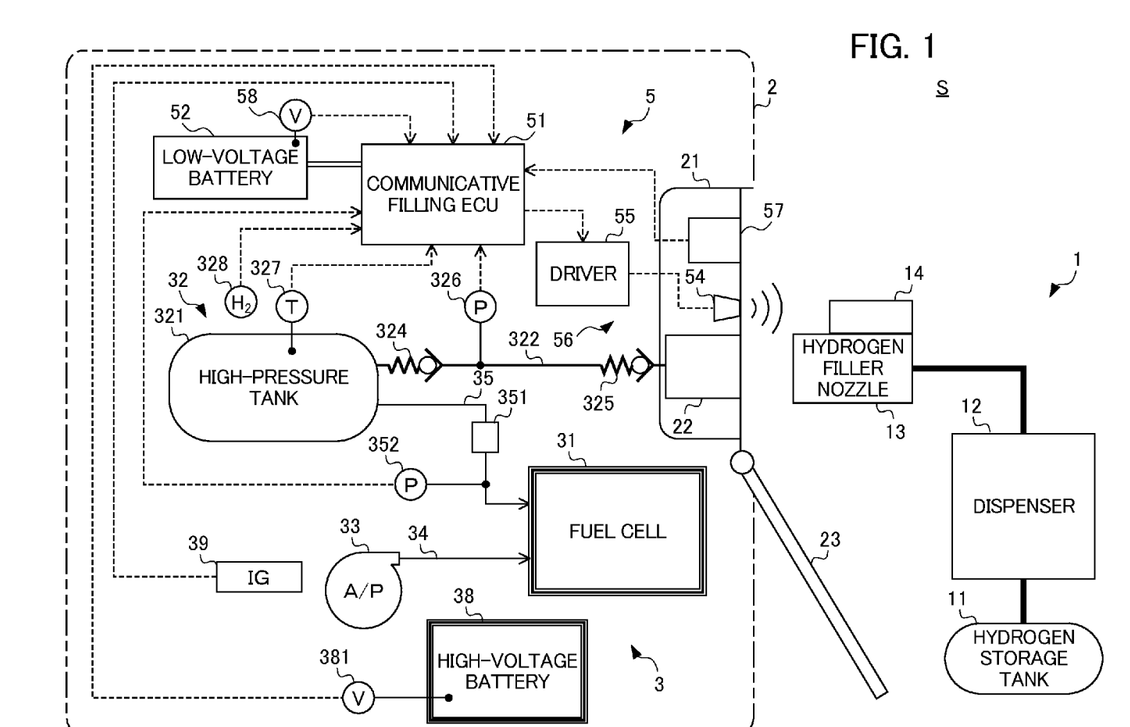
FIG. 1 is a view showing the configuration of a hydrogen filling system configured by a vehicle and a hydrogen gas station according to an embodiment of the present invention.

FIG. 1 is a view showing the configuration of a hydrogen filling system S configured by a vehicle 2 according to the present embodiment and a hydrogen gas station 1. The vehicle 2 is a moving body called a fuel cell vehicle, which includes a fuel cell system 3 that generates electricity using hydrogen stored in a high-pressure tank 32, and travels using the electric power generated by this fuel cell system 3. The hydrogen gas station 1 is established separately from the vehicle 2, and fills hydrogen required for the travel of the vehicle 2 into the high-pressure tank 32. Hereinafter, the configurations of the hydrogen gas station 1 and the fuel cell vehicle 2 will be explained in order.

Configuration of Hydrogen Gas Station

The hydrogen gas station 1 includes a hydrogen storage tank 11 and a dispenser 12.

Hydrogen to be supplied to the vehicle 2 is stored in the hydrogen storage tank 11 at high pressure. The hydrogen in this hydrogen storage tank 11 is gas arrived at by compressing with a compressor hydrogen produced by vaporizing liquid hydrogen, hydrogen produced by reforming a raw material by way of a reformer, hydrogen produced using an electrolyzer, or the like.

The dispenser 12 reduces the pressure of the hydrogen gas supplied from the hydrogen storage tank 11 when a hydrogen filler nozzle 13 thereof is inserted into a hydrogen feed port 22 provided to the vehicle 2, and upon adjusting to a preferred flowrate, supplies the hydrogen from the hydrogen filler nozzle 13. An infrared communication unit 14 is provided to this hydrogen filler nozzle 13. By inserting the hydrogen filler nozzle 13 into the hydrogen feed port 22, the infrared communication unit 14 becomes able to send and receive data signals via infrared waves with a communication system 5 described later that is equipped to the vehicle 2. Upon filling hydrogen into the vehicle 2 with the dispenser 12, it is possible to selectively execute the two filling methods of a filling method called communicative filling, and a filling method called non-communicative filling.

Communicative filling is a filling method of filling hydrogen into the vehicle 2 while performing communication between the vehicle 2 and the station 1. More specifically, the dispenser 12 receives data signals indicating the current state of the high-pressure tank 32 from the communication system 5 described later equipped to the vehicle 2 by way of the infrared communication unit 14, grasps the current state of the high-pressure tank 32 from this data signal, and fills hydrogen into the high-pressure tank 32 while adjusting the filling flowrate in accordance with the state.

Non-communicative filling is a filling method of filling hydrogen into the vehicle 2 without performing communication between the vehicle 2 and the station 1. More specifically, the dispenser 12 fills hydrogen into the high-pressure tank 32 at a fixed filling flowrate established in advance. The dispenser 12 assumes that the current state of the high-pressure tank 32 is high temperature during non-communicative filling; therefore, the filling flowrate is set to a relatively small value. However, different from communicative filling, in non-communicative filling, the dispenser 12 cannot grasp the current state of the high-pressure tank 32; therefore, even if the temperature inside of the tank rises during filling, the filling flowrate cannot be reduced in response thereto, and the filling continues at a fixed flowrate. For this reason, in non-communicative filling, the temperature inside of the high-pressure tank 32 during filling may approach a defined maximum temperature and filling may be interrupted prior to reaching complete filling. Therefore, if the temperature inside of the high-pressure tank 32 during filling not exceeding the defined maximum temperature is set as a condition, when comparing between communicative filling and non-communicative filling, communicative filling can more suitably control the filling flowrate; therefore, it can more quickly fill until complete filling or the vicinity thereof.

After the hydrogen filler nozzle 13 is inserted into the hydrogen feed port 22 by a user, the dispenser 12 starts the filling of hydrogen automatically with the filling method as communicative filling in a case of having received data signals from the communication system 5 on the vehicle 2 side. Subsequently, in a case of having received from the vehicle 2 side a filling method switch signal indicating to switch the filling method from communicative filling to non-communicative filling, in a case of no longer being able to receive a data signal from the vehicle 2 side, or a case of receiving a data signal corresponding to a non-signal from the vehicle 2 side, the filling method is switched from communicative filling to non-communicative filling.

Configuration of Fuel Cell Vehicle

The vehicle 2 includes the fuel cell system 3 and the communication system 5. The fuel cell system 3 includes a fuel cell 31, the high-pressure tank 32 that supplies hydrogen as fuel gas to this fuel cell 31, an air pump 33 that supplies air as oxidant gas to the fuel cell 31, a high-voltage battery 38, and an ignition switch 39 that detects a startup request to the fuel cell system 3.

The fuel cell 31 is a stack structure in which several tens to several hundreds of cells are layered, for example. Each cell of the fuel cell is configured by sandwiching a membrane electrode assembly (MEA) with a pair of separators. The membrane electrode assembly is configured from the two electrodes of an anode and cathode, and a solid polymer electrolyte membrane that is sandwiched between these electrodes. Normally, both electrodes are formed from a catalyst layer that contacts the solid polymer electrode membrane and on which oxidation/reduction reaction occurs, and a gas diffusion layer that contacts this catalyst layer.

The air pump 33 is connected to a cathode channel formed in a cathode side of the fuel cell 31 via an air supply line 34. The high-pressure tank 32 is connected to an anode channel formed in an anode side of the fuel cell 31 via a hydrogen supply line 35. A regulator 351 that reduces the pressure of the high-pressure hydrogen supplied from the high-pressure tank 32 to a pressure suited for electric power generation is provided in the hydrogen supply line 35.

When the fuel cell system 3 is started on the event of operation of the ignition switch 39 by the user, hydrogen from the high-pressure tank 32 is supplied to the anode channel of the fuel cell 31, and air from the air pump 33 is supplied to the cathode channel, whereby electric power generation is performed. The electric power generated by the fuel cell 31 is supplied to a drive motor that is not illustrated, whereby the vehicle 2 travels.

The high-voltage battery 38 stores the electric power generated by the fuel cell 31. The electric power stored in the high-voltage battery 38 is supplied mainly to auxiliary devices of the vehicle 2 such as the air pump 33 and the air-conditioning system, which is not illustrated, as well as to the drive motor.

The high-pressure tank 32 includes a tank main body 321 that stores hydrogen compressed to high pressure, and a hydrogen feed line 322. The hydrogen feed line 322 is connected at one end side to the tank main body 321, and the other end side is connected to the hydrogen feed port 22 provided inside of a lidded box 21 described later. In order to prevent hydrogen from back-flowing from the tank main body 321 side to outside of the vehicle 2, check valves 324 and 325 are provided in the hydrogen feed line 322 in the vicinity of the tank main body 321 and the vicinity of the hydrogen feed port 22, respectively.

The lidded box 21 is provided on a side at the rear of the vehicle 2, and protects inside thereof the hydrogen feed port 22. A lid 23 is provided rotatably to this lidded box 21. At the hydrogen gas station 1, the user opens the lid 23 to expose the hydrogen feed port 22 to outside, and then inserts the hydrogen filler nozzle 13 of the dispenser 12 into the hydrogen feed port 22 to fill hydrogen.

In addition, the fuel cell system 3 is provided with a plurality of sensors for detecting the state thereof.

A pressure sensor 326, temperature sensor 327, and hydrogen concentration sensor 328 are provided in the high-pressure tank 32 or in the vicinity thereof as sensors for detecting the state thereof. The pressure sensor 326 detects the hydrogen pressure of the high-pressure tank 32 inside of the hydrogen feed line 322, and sends a detection signal substantially proportional to a detection value to the communication system 5. The temperature sensor 327 detects the hydrogen temperature of the high-pressure tank 32 inside of the tank main body 321, and sends a detection signal substantially proportional to a detection value to the communication system 5. The hydrogen concentration sensor 328 detects the hydrogen concentration in the vicinity of the tank main body 321, and sends a detection signal substantially proportional to a detection value to the communication system 5. For example, in a case of hydrogen having leaked from the tank main body 321 during the filling of hydrogen, the fact that hydrogen is leaking can be determined by way of the hydrogen concentration sensor 328.

A voltage sensor 381 for the high-voltage battery is provided to the high-voltage battery 38 as a sensor for detecting the amount of charge thereof. This voltage sensor 381 detects the voltage of the high-voltage battery 38, and sends a detection signal substantially proportional to a detection value to the communication system 5. The amount of charge in the high-voltage battery 38 can be calculated based on the detection value of the voltage sensor 381.

An intermediate-pressure sensor 352 is provided in the hydrogen supply line 35 further downstream than the regulator 351. The intermediate-pressure sensor 352 detects the hydrogen pressure inside of the hydrogen supply line 35 on a side further downstream than the regulator 351, and sends a detection signal substantially proportional to a detection value to the communication system 5. In a case of hydrogen having leaked from the hydrogen supply line 35 due to failure of the regulator 351, the fact that the regulator 351 has failed can be determined with the fluctuation in the detection value of the intermediate-pressure sensor 352.

The communication system 5 includes a communicative filling ECU 51, low-voltage battery 52, infrared transmitter 56, lid switch 57, and voltage sensor 58 for the low-voltage battery.

The low-voltage battery 52 is used as the electric power supply source of electric devices constituting the communication system 5 such as the communicative filling ECU 51, infrared transmitter 56 and lid switch 57, mainly; however, in addition to the communication system 5, it is also used as an electric power supply source of auxiliary devices of the vehicle 2 that are not illustrated. This low-voltage battery 52 is configured so as to be charged by the electric power generated by the fuel cell 31. The voltage sensor 58 detects the voltage of the low-voltage battery 52, and sends a detection signal substantially proportional to a detection value to the communicative filling ECU 51. It should be noted that, when comparing the low-voltage battery 52 serving as the main electric power source of the communication system 5 and the high-voltage battery 38 of the aforementioned fuel cell system 3, the high-voltage battery 38 has a larger discharge capacity.

The lid switch 57 is provided to the lidded box 21, and detects the opened/closed state of the lid 23. In a state in which the lid 23 is closed and the hydrogen feed port 22 is protected inside of the lidded box 21, the lid switch 24 sends a closed signal indicating this to the communicative filling ECU 51, and in a case in which the lid 23 is opened and the hydrogen feed port 22 is exposed to outside, sends an opened signal indicating this to the communicative filling ECU 51. It should be noted that either among this closed signal and opened signal may be set as a non-signal.

The infrared transmitter 56 is configured by an infrared LED 54 and a driver 55 thereof. The driver 55 switches on and off the infrared LED 54 based on a data signal sent from the communicative filling ECU 51.

The communicative filling ECU 51 is a control device that controls various devices constituting the communication system 5 for performing communicative filling, and is configured to include a CPU, ROM, RAM and electronic circuits such as various interfaces. The detection signals from the various sensors of the communication system 5 and fuel cell system 3, such as the lid switch 57, voltage sensor 58 for low-voltage battery, pressure sensor 326, temperature sensor 327, hydrogen concentration sensor 328, voltage sensor 381 for high-voltage battery and ignition switch 39, are inputted to the communicative filling ECU 51.

During the execution of communicative filling, since the communicative filling ECU 51 sends information related to the current state of the high-pressure tank 32 to the station 1 side, it generates a data signal based on the pressure and temperature detected by the pressure sensor 326 and temperature sensor 327, and sends this data signal to the driver 55. The driver 55 sends a data signal to the infrared communication unit 14 on the station 1 side by causing the infrared LED 54 to switch on and off in response thereto.

The communication system 5 configured in the above way starts/stops on the event of the opening/closing of the lid 23 by the user. Hereinafter, the startup sequence and stop sequence of the communication system 5 will be explained.

Startup of Communication System

When the lid 23 is opened by the user, the lid switch 57 detects this, and sends an opened signal indicating that the lid 23 has been opened to the communicative filling ECU 51, which is in a sleep state. In response thereto, the communicative filling ECU 51 returns from the sleep state, and starts the supply of electric power from the low-voltage battery 52 to the infrared transmitter 56. Subsequently, a state is entered in which the transmission of data signals from the communication system 5 is possible, the hydrogen filler nozzle 13 on the station 1 side being inserted into the hydrogen feed port 22, and in response to the filling of hydrogen and having entered as state in which communication between the vehicle 2 and the station 1 is possible, communicative filling starts.

Stoppage of Communication System

When communicative filling ends appropriately, the hydrogen filler nozzle 13 is removed from the hydrogen feed port 22 by the user, and then the lid 23 is closed. When the lid 23 is closed, the lid switch 57 detects this, and sends a closed signal indicating that the lid 23 has been closed to the communicative filling ECU 51. In response thereto, the communicative filling ECU 51 stops the supply of electric power to the infrared transmitter 56, and enters the sleep state.

Next, referencing FIGS. 2 to 6, two examples for specific sequences on the vehicle side upon filling hydrogen will be explained.

Figure 2:
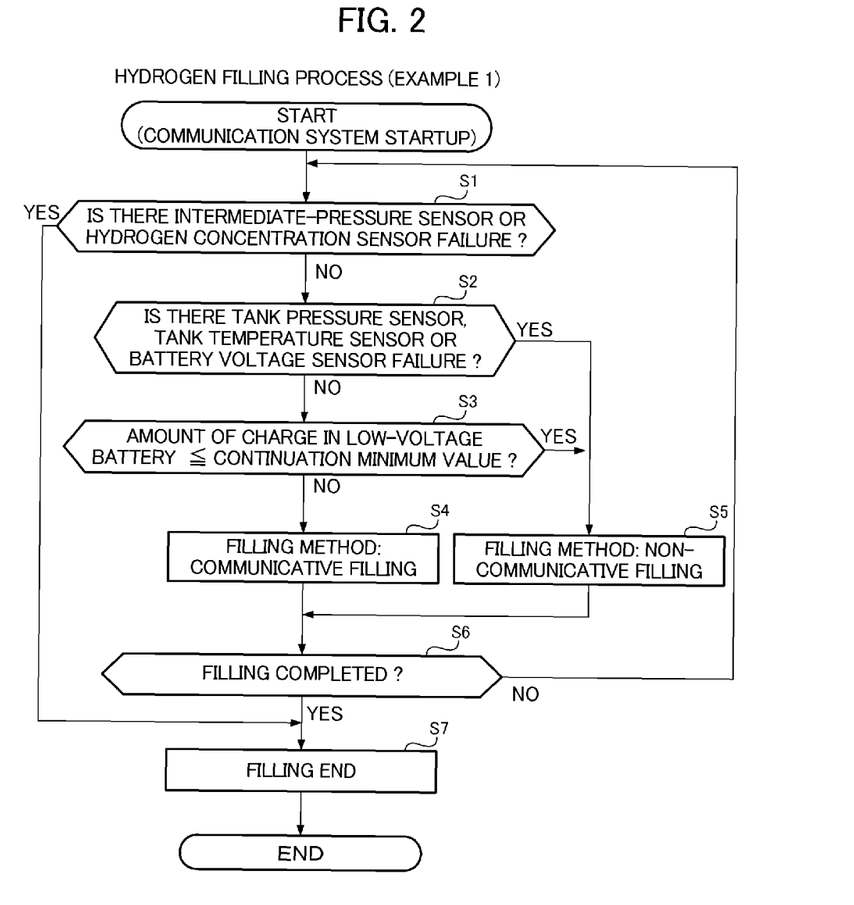
FIG. 2 is a flowchart showing the sequence of a hydrogen filling process (Example 1)

FIG. 2 is a flowchart showing the sequence of a hydrogen filling process of Example 1. The process shown in FIG. 2 starts in response to the communication system having started up appropriately after the hydrogen filler nozzle was inserted into the hydrogen feed port. In other words, the filling method when starting this process is communicative filling.

In S1, it is determined whether the intermediate-pressure sensor or hydrogen concentration sensor are failing. In the case of the determination in S1 being YES, i.e. in a case of at least either of the below two conditions 1 and 2 being satisfied, the processing advances to S7, and filling of hydrogen is immediately ended during execution, without performing the processing of S2 to S6.

Condition 1 is a case of having determined that the intermediate-pressure sensor has failed.

If the intermediate-pressure sensor fails, leaking of hydrogen at the regulator may not be able to be quickly detected.

Condition 2 is a case of having determined that the hydrogen concentration sensor has failed.

If the hydrogen concentration sensor fails, even if hydrogen is leaking from the high-pressure tank during filling, this may not be able to be detected quickly. For this reason, in a case of this intermediate-pressure sensor or hydrogen concentration sensor failing, it is determined that the continuation of hydrogen filling is not possible, and hydrogen filling is immediately interrupted irrespective of the current filling method being communicative filling or non-communicative filling. It should be noted a previously known method is used in the determination of sensor failure in S1. More specifically, in a case of providing two of both the intermediate-pressure sensor and the hydrogen concentration sensor, and there being a great difference in the detection value of each, it can be determined that either has failed. In addition, in a case of using an intermediate-pressure sensor and hydrogen concentration sensor to which an automatic diagnoses function is built-in, failure can be determined using this function. In the case of the determination in S1 being NO, the processing advances to S2.

In S2, it is determined whether or not at least one among the tank pressure sensor, tank temperature sensor and voltage sensor of the low-voltage battery is failing. It should be noted that a previously known method is used in the determination of sensor failure, similarly to the above-mentioned hydrogen concentration sensor, intermediate-pressure sensor, etc. In the case of the determination in S2 being NO, the processing advances to S3.

In S3, it is determined whether or not it is a state in which the amount of charge in the low-voltage battery, which is the communication power source of the communication system, has declined. More specifically, the amount of charge in the low voltage battery is calculated based on the detection value of the voltage sensor of the low-voltage battery, and it is determined whether this is no higher than a predetermined communication continuation minimum value.

It should be noted that, in S3, although the determination of whether or not it is a state in which the amount of charge in the low-voltage battery has declined is performed by calculating the amount of charge and then comparing this with a predetermined continuation minimum value, the present invention is not limited thereto. Since the voltage of the battery also declines accompanying a decline in the amount of charge, by comparing the voltage of the low-voltage battery (detection value of battery voltage sensor) with a predetermined threshold, it is possible to perform a substantially equivalent determination without calculating the amount of charge.

In the case of the determinations of S2 and S3 both being NO, it is determined that hydrogen can be continued to be filled by communicative filling, the communicative filling continues (S4), and the processing advances to S6.

On the other hand, in the case of either of the determinations of S2 and S3 being YES, i.e. in the case of at least any among the below four conditions 3 to 6 being satisfied, communicative filling cannot be continued; however, it is determined that hydrogen can be continued to be filled by switching to non-communicative filling, the filling method is set to non-communicative filling (S5), and the processing advances to S6.

Condition 3 is a case of the amount of charge in the communication power source (low-voltage battery) being no higher than a continuation minimum value.

Condition 4 is a case of having determined that the tank pressure sensor has failed.

Condition 5 is a case of having determined that the tank temperature sensor has failed.

Condition 6 is a case of having determined that the voltage sensor of the communication power source having failed.

It should be noted that switching from communicative filling to non-communicative filling is performed by sending an instruction signal from the vehicle side to the station side indicating to switch to non-communicative filling, stopping the sending of data signals from the vehicle side to the station side, or sending a data signal corresponding to a non-signal from the vehicle side to the station side.

It should be noted that, in the case of switching the filling method from communicative filling to non-communicative filling in S5, the communicative filling ECU records, as a filling log, information related to communicative filling having been executed, and switches the filling method from communicative filling to non-communicative filling. By recording such a filling log, the primary factors switching from communicative filling to non-communicative filling are immediately divided into the vehicle side or the station side; therefore, it is possible to rapidly deal therewith during the subsequent maintenance.

Herein, the communication continuation minimum value of S3 will be explained.

Figure 3:
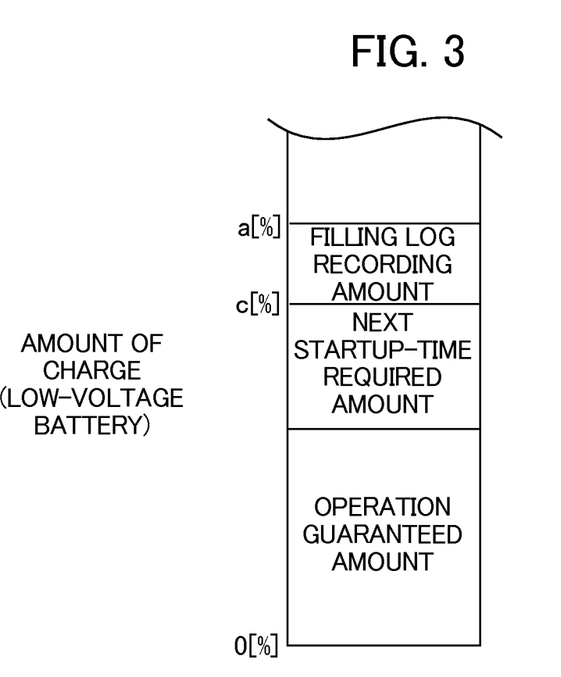
FIG. 3 is a view schematically showing a breakdown of the amount of charge in a low-voltage battery.

FIG. 3 is a view schematically showing a breakdown of the amount of charge in the low-voltage battery. It should be noted that the amount of charge is expressed in percentage (%) in FIG. 3.

If the amount of charge in the low-voltage battery declines excessively, the battery voltage will greatly decline from a rated value thereof (e.g., 12 V) after passing a certain threshold; therefore, the operation of devices driven by the low-voltage battery (communicative filling ECU, infrared transmitter, etc.) is no longer guaranteed. In FIG. 3, "operation guaranteed amount" corresponds to the minimum required amount in order to guarantee the operation of these devices. In FIG. 3, "next startup-time required amount" corresponds to an amount required in the low-voltage battery during a next startup of the fuel cell vehicle 2. In addition, "filling log recording amount" in FIG. 3 corresponds to the amount required in the low-voltage battery in order to electromagnetically record the filling log needed to be recording upon switching from communicative filling to non-communicative filling. In the above S3, the communication continuation minimum value used in the determination of the timing of switching from communicative filling to non-communicative filling is defined as a value summing this operation guaranteed amount, next startup-time required amount and filling log recording amount, i.e. threshold "a" in FIG. 3. It is thereby possible to ensure the amount of charge required for operational guarantee of devices and subsequent vehicle startup, while reliably recording the filling log when switching from communicative filling to non-communicative filling.

Referring back to FIG. 2, it is determined whether filling has completed in S6. In the case of the determination in S6 being NO, the processing returns to S1 again, and in the case of being YES, the processing advances to S7, and filling is ended. Whether or not filling has completed in S6 can be determined by comparing the detection value of the pressure sensor with a predetermined threshold, for example.

Figure 4:
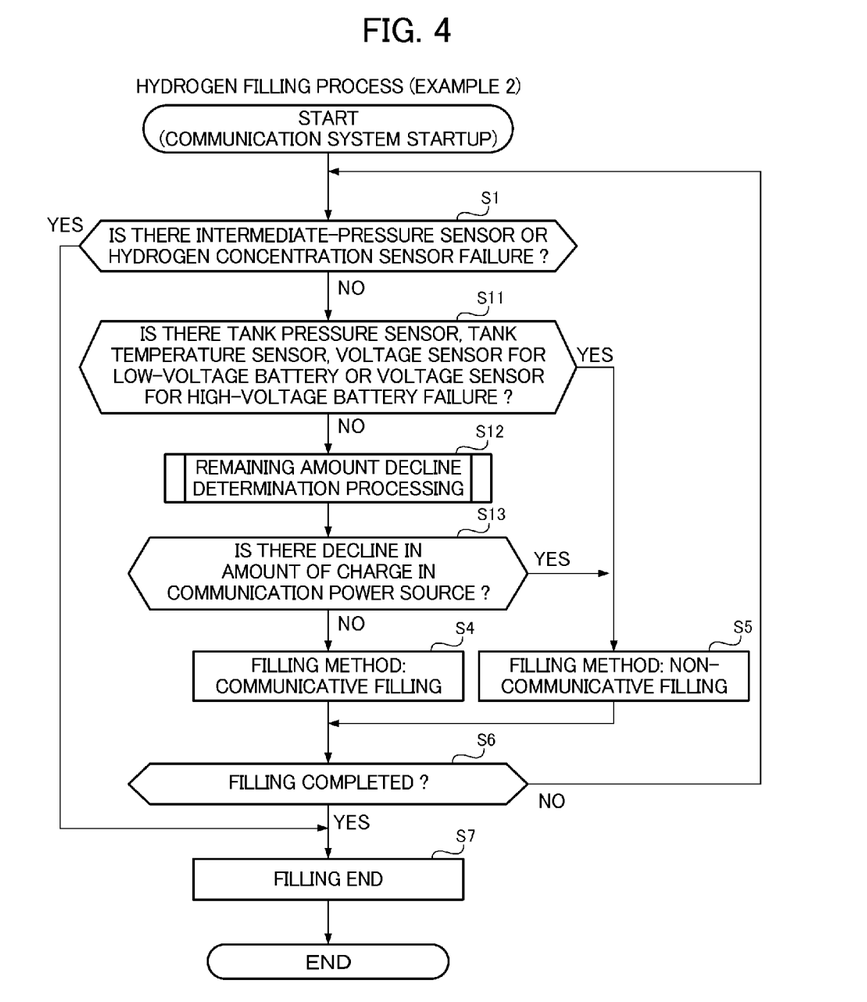
FIG. 4 is a flowchart showing the sequence of a hydrogen filling process (Example 2)

FIG. 4 is a flowchart showing the sequence of a hydrogen filling process of Example 2.

S11 to S13 differ from the flowchart of Example 1 in the aforementioned FIG. 2. All of the other steps are the same, and thus detailed explanations thereof will be omitted.

In the hydrogen filling process of the above-mentioned Example 1, only the low-voltage battery is considered as the communication power source of the communication system; however, in the hydrogen filling process of the present example, the communication power source of the communication system is switched from the low-voltage battery to the high-voltage battery. In the present example, the low-voltage battery is established as the main communication power source, and the high-voltage battery establishes an auxiliary communication power source during a decline in the remaining amount of the low-voltage battery. Therefore, the communication power source during the start of this processing is the low-voltage battery.

In S11, it is determined whether at least one among the tank pressure sensor, tank temperature sensor, voltage sensor of the low-voltage battery and voltage sensor of the high-voltage battery are failing. It should be noted that a previously known method is used in the determination of failure of these sensors, similarly to Example 1. In the case of the determination in S11 being NO, the processing advances to S12.

In S12, remaining amount decline determination processing is executed to determine whether it is a state in which the amount of charge in the communication power source currently selected is sufficient, and then the processing advances to S13. A detailed sequence of this remaining amount decline determination processing will be explained while referencing FIG. 5 later. In S13, it is determined whether or not the determination results in S12 determined that there is a decline in remaining amount for the amount of charge in the communication power source selected.

In the case of the determinations of S11 and S13 both being NO, it is determined that hydrogen can continue to be filled by communicative filling, communicative filling is continued (S4), and the processing advances to S6.

On the other hand, in the case of either among the determinations in S11 and S13 being YES, i.e. in the case of at least any among the below four conditions 7 to 10 being satisfied, it is determined that, although communicative filling cannot be continued, hydrogen can be continued to be filled by switching to non-communicative filling, the filling method is set to non-communicative filling (S5), and the processing advances to S6.

Condition 7 is a case of both the amount of charge in the low-voltage battery and the amount of charge in the high-voltage battery that may be the communication power source are respectively no higher than a communication continuation minimum value.

Condition 8 is a case of having determined that the tank pressure sensor has failed.

Condition 9 is a case of having determined that the tank temperature sensor has failed.

Condition 10 is a case of having determined that the voltage sensor of the communication power source has failed.

Figure 5:
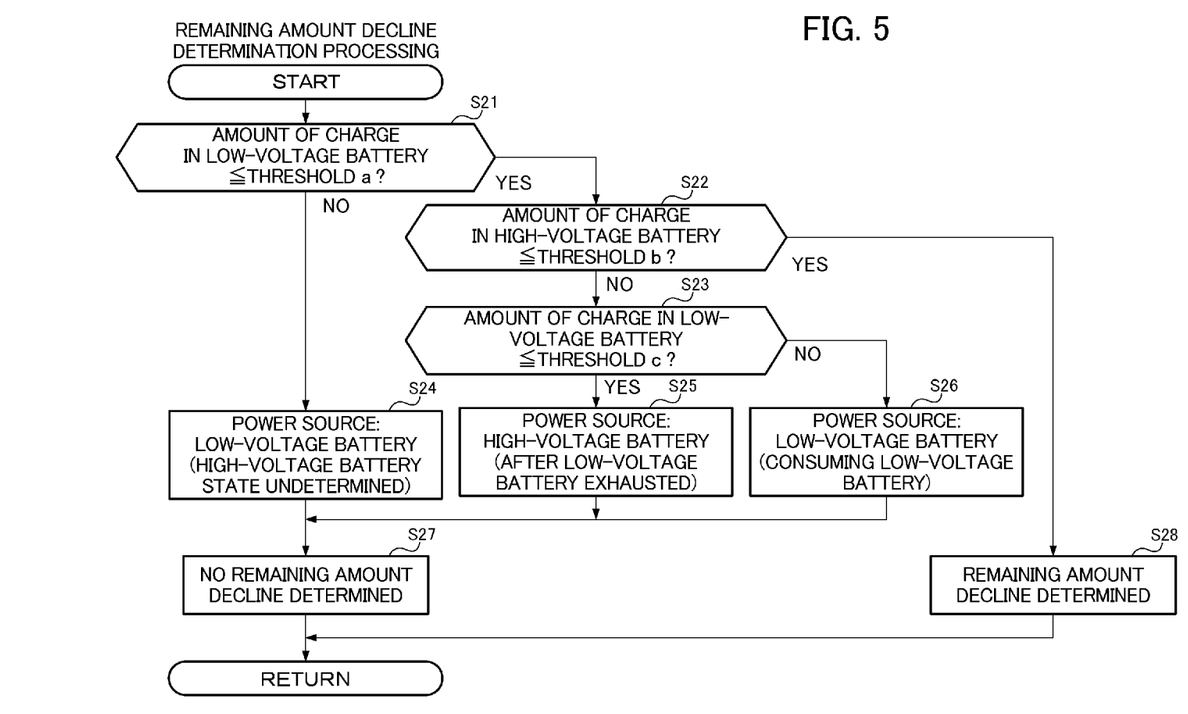
FIG. 5 is a flowchart showing the sequence of remaining-amount decline determination processing (Example 2)

FIG. 5 is a flowchart showing the sequence of remaining amount decline determination processing. This processing is constituted by a step of comparing the current amount of charge in the low-voltage battery and the high-voltage battery that may be the communication power source with various thresholds and determining the current state of each battery (S21 to S23), a step of selecting an appropriate communication power source based on these comparison results (S24 to S26), and a step of determining the decline in the amount of charge in the battery selected as the communication power source (S27, S28).

First, the three thresholds a, b and c set for the amount of charge in the low-voltage battery and the amount of charge in the high-voltage battery will be explained while referencing FIGS. 3 and 6.

As shown in FIG. 3, the threshold a and the threshold c are set for the amount of charge in the low-voltage battery. The threshold c is a value summing the aforementioned operation guaranteed amount and next startup required amount, and the threshold a is a value further adding a filling log recording amount to the threshold c. In addition, the threshold a is set as a communication continuation minimum value of the low-voltage battery.

Figure 6:
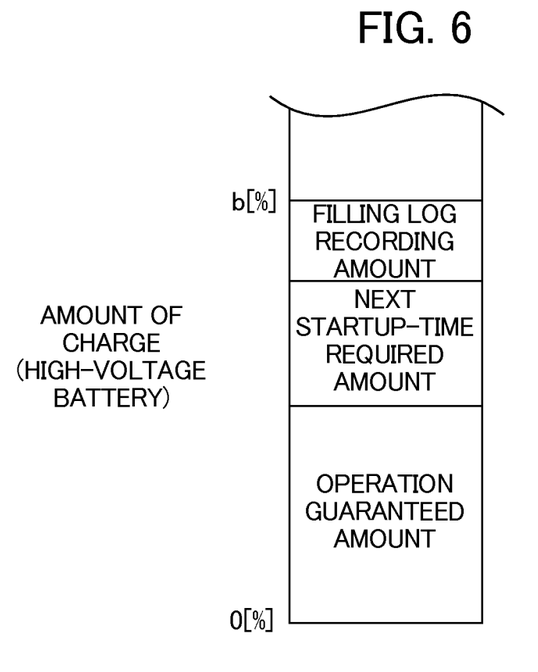
FIG. 6 is a view schematically showing a breakdown of the amount of charge in a high-voltage battery.

FIG. 6 is a view schematically showing a breakdown of the amount of charge in the high-voltage battery. It should be noted that the amount of charge is expressed in percentage (%) in FIG. 6.

The threshold b is set for the amount of charge in the high-voltage battery. The threshold b is a value summing the "operation guaranteed amount" corresponding to a minimum required amount in order to guarantee the normal operation of devices (drive motor, other auxiliary devices, etc.) driven by the high-voltage battery, the "next startup-time required amount" corresponding to an amount required in the high-voltage battery during subsequent startup of the fuel cell vehicle 2, and the "filling log recording amount" corresponding to an amount required in the high-voltage battery in order to electromagnetically record filling logs upon switching from communicative filling to non-communicative filling. In addition, the threshold b is established as a communication continuation minimum value of the high-voltage battery.

Referring back to FIG. 5, first, in S21, it is determined whether the amount of charge in the low-voltage battery is no higher that the above-mentioned threshold a. In the case of this determination being NO, it is determined that switching of the communication power source is unnecessary, the communication power source remains set as the low-voltage battery (S24), and it is determined that there is no decline in the amount of charge in the communication power source (S27).

In the case of the determination in S21 being YES, i.e. in a case where, while executing communicative filling with the low-voltage battery as the communication power source, the amount of charge thereof having become no higher than the threshold a, the processing is advanced to S22 to determine whether switching to the high-voltage battery is possible. In S22, it is determined whether the amount of charge in the high-voltage battery is no higher than the threshold b. Herein, a case of the determination in S22 being NO indicates being a state in which there is surplus in the amount of charge in the high-voltage battery, and thus is a state in which communication power source can be continued by switching the communication power source to the high-voltage battery.

In the case of the determination in S21 being NO and there being surplus in the amount of charge in the high-voltage battery, the processing advances to S23, and it is determined whether the amount of charge in the low-voltage battery is no higher than the threshold c. A case of executing the step of S23 indicates there being a surplus in the amount of charge in the high-voltage battery as stated above; however, this is a state that can simultaneously burden the filling log recording amount on the high-voltage battery, and this indicates the amount of charge in the low-voltage battery will not be hindered even if exhausted down to this filling log recording amount.

Therefore, in the case of the determination in S23 being NO and the amount of charge in the low-voltage battery being greater than the threshold c, the communication power source remains set as the low-voltage battery (S26) to exhaust the amount of charge in the low-voltage battery down to the threshold c, the processing is advanced to S27, and it is determined that there is no decline in the amount of charge in the communication power source.

On the other hand, in the case of the determination in S23 being YES and the amount of charge in the low-voltage battery being no higher than the threshold c, i.e. in the case of being after the low-voltage battery has been exhausted while keeping the next startup-time required amount, it is determined that there is no decline in the amount of charge in the communication power source (S27) after having switched the communication power source from the low-voltage battery to the high-voltage battery (S25).

In the case of the determination in S22 being YES, since the amount of charge for both the low-voltage battery and high-voltage battery are no higher than the communication continuation minimum values, respectively, it is determined that the amount of charge in the communication power source has declined, irrespective of the current communication power source being the low-voltage batter or the high-voltage battery (S28).

The followings effects are exerted according to the fuel cell vehicle 2 of the present embodiment described in detail above.

(1) According to the present embodiment, filling in itself is not immediately interrupted just because it has been determined that the continuation of communicative filling is not possible; therefore, although there is a possibility of filling not being carried out to the vicinity of complete filling and a possibility of requiring a long time in filling when compared with a case of continuously performing communicative filling, it is possible to fill as much hydrogen as possible into the high-pressure tank.

(2) According to the present embodiment, as in cases such as a case of the temperature sensor having failed, the pressure sensor having failed, the amount of charge in the communication power source having declined or the voltage sensor for detecting this amount of charge having failed, it is possible to continue filling of as much hydrogen as possible by appropriately determining that continuation of filling is possible despite the continuation of communicative filling not being possible.

(3) According to the present embodiment, it is possible to appropriately distinguish between a case in which the continuation of filling is possible by switching from communicative filling to non-communicative filling, and a case in which the continuation of filling in itself of hydrogen is not possible irrespective of the filling method.

(4) According to the present embodiment, it is possible to appropriately end filling by appropriately determining states in which the continuation of the filling of hydrogen is not possible irrespective of the filling method, such as a case of the hydrogen concentration sensor having failed and a case of the intermediate-pressure sensor having failed.

(5) According to the present embodiment, by switching the filling method from communicative filling to non-communicative filling in a case of the amount of charge in the communication power source having become no higher than a continuation minimum value set as described above, it is possible to ensure a remaining amount of communication power source by a next startup-time required amount, while reliably leaving a filling log at the time of switching. In addition, since the amount of charge in the communication power source during communicative filling will not fall below the minimum required amount in order to guarantee normal operation of the communicative filling ECU, infrared transmitter, etc., it is possible to prevent inaccurate data signals from being transmitted from the communication system.

(6) According to the present embodiment, in the case of having preparing the two electrical power sources of the low-voltage battery and high-voltage battery, using the low-voltage battery as the communication power source and the amount of charge thereof having become small during the use thereof, it is possible to continue communicative filling as long as possible by continuing communicative filling upon switching the communication power source to the high-voltage battery. In addition, by determining the timing at which to switch the communication power source with the aforementioned thresholds a to c, it is possible to ensure the amount of charge in the low-voltage battery and high-voltage battery by the amount required during a subsequent startup, while reliably leaving a filling log as described above.

(7) In the present embodiment, by exhausting the amount of charge in the low-voltage battery down until the amount required in recording of the above-mentioned filling log, prior to switching the communication power source from the low-voltage battery to the high-voltage battery, it is possible to prevent useless switching of the communication power source, and thus reduce the energy loss accompanying the switching of the communication power source.

Although an embodiment of the present invention has been explained above, the present invention is not to be limited thereto.

An example in which the storage vessel storing fuel gas is a high-pressure tank has been explained in the above-mentioned embodiment; however, it is not limited thereto, and a hydrogen tank equipped with a storage alloy may be the storage vessel.

In addition, an example of a fuel cell vehicle with hydrogen as the fuel gas has been explained in the above-mentioned embodiment; however, it is not limited thereto, and can also be applied to a natural gas vehicle in which natural gas is established as the fuel gas.

Furthermore, an example in which a fuel cell vehicle is established as the moving body has been explained in the above-mentioned embodiment; however, it is not limited thereto, and it can also be applied to moving bodies such as motorbikes, ships, spacecraft and robots.

What is claimed is:

1. A moving body comprising:
   a storage vessel that stores a fuel gas;
   a pressure detection means for detecting a pressure inside of the storage vessel;
   a temperature detection means for detecting a temperature of the storage vessel;
   a transmitting means for externally transmitting a data signal generated based on the pressure and the temperature thus detected;
   a communication electric power supply means for providing an electric power source that supplies electric power to the transmitting means; and
   a control means for selectively executing, as a method of filling fuel gas from an external supply device to the storage vessel, communicative filling that transmits the data signal from the transmitting means to the supply device and allows the fuel gas to be filled by way of the supply device into the storage vessel at a flowrate dependent on the pressure and the temperature; and non-communicative filling that allows the fuel gas to be filled by the supply device into the storage vessel at a predetermined flowrate,
   wherein the control means comprises:
   a communication continuation determination means for determining, while executing communicative filling, whether continued execution of the communicative filling is possible; and
   a filling method switching means for interrupting communicative filling during execution, and continuing filling of the fuel gas by switching the filling method to non-communicative filling, in response to the communication continuation determination means having determined that continuation of communicative filling is not possible.

2. The moving body according to claim 1, wherein the communication continuation determination means determines that continuation of communicative filling is not possible in the case of any one of the following four conditions having been satisfied:
   1: case of an amount of charge in a communication power source being no higher than a predetermined continuation minimum value, wherein the communication power source is the power source supplying electric power to the transmitting means;
   2: case of having determined that the pressure detection means has failed;
   3: case of having determined that the temperature detection means has failed; and
   4: case of having determined that a remaining amount detection means for detecting the amount of charge in the communication power source has failed.

3. The moving body according to claim 2, wherein the control means further comprises:
   a filling continuation determination means for determining whether filling of the fuel gas can continue to be executed while executing communicative filling or non-communicative filling; and
   a filling end means for interrupting communicative filling or non-communicative filling during execution, and ending filling of the fuel gas, in response to the filling continuation determination means having determined that continuation of filling is not possible.

4. The moving body according to claim 3,
   wherein the fuel gas is hydrogen,
   wherein the storage vessel is a high-pressure tank that stores hydrogen at high pressure,
   wherein the moving body comprises a fuel cell that generates electric power using hydrogen supplied from the high-pressure tank via a hydrogen supply pipe, and
   wherein the filling continuation determination means determines that continuation of filling of the fuel gas is not possible in a case of at one among the following two conditions having been satisfied:

1: case of having determined that a hydrogen sensor that detects a hydrogen concentration in a vicinity of the high-pressure tank has failed; and 2: case of having determined that an intermediate-pressure sensor that detects pressure in the hydrogen supply pipe on a side further downstream than a portion at which a regulator that reduces the pressure of high-pressure hydrogen inside of the high-pressure tank is provided has failed.

5. The moving body according to claim 4, wherein the continuation minimum value is a value summing a minimum required amount for guaranteeing normal operation of a plurality of devices driven by electric power from the communication power source, an amount required in the communication power source during next startup of the moving body, and an amount required in the communication power source for electromagnetically recording information related to filling.

6. The moving body according to claim 4,
wherein the communication electric power supply means includes a first electricity storage device as an electric power source that supplies electric power to a plurality of auxiliary devices including the transmitting means, and a second electricity storage device having a larger discharge capacity than the first electricity storage device,
wherein a first threshold is defined as a value summing a minimum required amount for guaranteeing normal operation of a plurality of devices driven by electric power from the first electricity storage device and an amount required in the first electricity storage device during next startup of the moving body,
wherein a second threshold is defined as a value adding to the first threshold an amount required in the first electricity storage device for electromagnetically recording information related to filling,
wherein a third threshold is defined as a value summing a minimum required amount for guaranteeing normal operation of a plurality of device driven by electric power from the second electricity storage device, an amount required in the second electricity storage device during next startup of the moving body, and an amount required in the second electricity storage device for electromagnetically recording information related to filling, and
wherein the control means further comprises a communication power source switching means for switching the communication power source from the first electricity storage device to the second electricity storage device, in a case of the amount of charge in the second electricity storage device being larger than the third threshold, when the amount of charge in the first electricity storage device becomes no higher than the second threshold while executing communicative filling with the first electricity storage device as the communication power source.

7. The moving body according to claim 6, wherein the communication power source switching means, in a case of switching from the first electricity storage device to the second electricity storage device, switches to the second electricity storage device after the amount of charge in the first electricity storage device has declined down to the first threshold.

8. The moving body according to claim 3, wherein the continuation minimum value is a value summing a minimum required amount for guaranteeing normal operation of a plurality of devices driven by electric power from the communication power source, an amount required in the communication power source during next startup of the moving body, and an amount required in the communication power source for electromagnetically recording information related to filling.

9. The moving body according to claim 3,
wherein the communication electric power supply means includes a first electricity storage device as an electric power source that supplies electric power to a plurality of auxiliary devices including the transmitting means, and a second electricity storage device having a larger discharge capacity than the first electricity storage device,
wherein a first threshold is defined as a value summing a minimum required amount for guaranteeing normal operation of a plurality of devices driven by electric power from the first electricity storage device and an amount required in the first electricity storage device during next startup of the moving body,
wherein a second threshold is defined as a value adding to the first threshold an amount required in the first electricity storage device for electromagnetically recording information related to filling,
wherein a third threshold is defined as a value summing a minimum required amount for guaranteeing normal operation of a plurality of device driven by electric power from the second electricity storage device, an amount required in the second electricity storage device during next startup of the moving body, and an amount required in the second electricity storage device for electromagnetically recording information related to filling, and
wherein the control means further comprises a communication power source switching means for switching the communication power source from the first electricity storage device to the second electricity storage device, in a case of the amount of charge in the second electricity storage device being larger than the third threshold, when the amount of charge in the first electricity storage device becomes no higher than the second threshold while executing communicative filling with the first electricity storage device as the communication power source.

10. The moving body according to claim 9, wherein the communication power source switching means, in a case of switching from the first electricity storage device to the second electricity storage device, switches to the second electricity storage device after the amount of charge in the first electricity storage device has declined down to the first threshold.

11. The moving body according to claim 2, wherein the continuation minimum value is a value summing a minimum required amount for guaranteeing normal operation of a plurality of devices driven by electric power from the communication power source, an amount required in the communication power source during next startup of the moving body, and an amount required in the communication power source for electromagnetically recording information related to filling.

12. The moving body according to claim 11,
wherein the communication electric power supply means includes a first electricity storage device as an electric power source that supplies electric power to a plurality of auxiliary devices including the transmitting means, and a second electricity storage device having a larger discharge capacity than the first electricity storage device,
wherein a first threshold is defined as a value summing a minimum required amount for guaranteeing normal operation of a plurality of devices driven by electric power from the first electricity storage device and an amount required in the first electricity storage device during next startup of the moving body, wherein a second threshold is defined as a value adding to the first threshold an amount required in the first electricity storage device for electromagnetically recording information related to filling, wherein a third threshold is defined as a value summing a minimum required amount for guaranteeing normal operation of a plurality of device driven by electric power from the second electricity storage device, an amount required in the second electricity storage device during next startup of the moving body, and an amount required in the second electricity storage device for electromagnetically recording information related to filling, and wherein the control means further comprises a communication power source switching means for switching the communication power source from the first electricity storage device to the second electricity storage device, in a case of the amount of charge in the second electricity storage device being larger than the third threshold, when the amount of charge in the first electricity storage device becomes no higher than the second threshold while executing communicative filling with the first electricity storage device as the communication power source.

13. The moving body according to claim 12, wherein the communication power source switching means, in a case of switching from the first electricity storage device to the second electricity storage device, switches to the second electricity storage device after the amount of charge in the first electricity storage device has declined down to the first threshold.

14. The moving body according to claim 2,
wherein the communication electric power supply means includes a first electricity storage device as an electric power source that supplies electric power to a plurality of auxiliary devices including the transmitting means, and a second electricity storage device having a larger discharge capacity than the first electricity storage device, wherein a first threshold is defined as a value summing a minimum required amount for guaranteeing normal operation of a plurality of devices driven by electric power from the first electricity storage device and an amount required in the first electricity storage device during next startup of the moving body, wherein a second threshold is defined as a value adding to the first threshold an amount required in the first electricity storage device for electromagnetically recording information related to filling, wherein a third threshold is defined as a value summing a minimum required amount for guaranteeing normal operation of a plurality of device driven by electric power from the second electricity storage device, an amount required in the second electricity storage device during next startup of the moving body, and an amount required in the second electricity storage device for electromagnetically recording information related to filling, and wherein the control means further comprises a communication power source switching means for switching the communication power source from the first electricity storage device to the second electricity storage device, in a case of the amount of charge in the second electricity storage device being larger than the third threshold, when the amount of charge in the first electricity storage device becomes no higher than the second threshold while executing communicative filling with the first electricity storage device as the communication power source.

15. The moving body according to claim 14, wherein the communication power source switching means, in a case of switching from the first electricity storage device to the second electricity storage device, switches to the second electricity storage device after the amount of charge in the first electricity storage device has declined down to the first threshold.

* * * * *